(12) United States Patent
Ju et al.

(10) Patent No.: US 7,695,779 B2
(45) Date of Patent: Apr. 13, 2010

(54) ORGANIC COMPOSITION, LIQUID CRYSTAL DISPLAY INCLUDING THE SAME AND METHOD OF MANUFACTURING LIQUID CRYSTAL DISPLAY

(75) Inventors: Jin-ho Ju, Seoul (KR); Dong-ki Lee, Yongin-si (KR); Hi-kuk Lee, Yongin-si (KR); Shi-yul Kim, Yongin-si (KR); Jae-ho Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 900 days.

(21) Appl. No.: 11/404,531

(22) Filed: Apr. 14, 2006

(65) Prior Publication Data
US 2007/0042136 A1    Feb. 22, 2007

(30) Foreign Application Priority Data
Aug. 19, 2005   (KR) .................. 10-2005-0076350

(51) Int. Cl.
*C09K 19/56* (2006.01)

(52) U.S. Cl. .................. 428/1.2; 349/123; 252/299.4; 430/270.1; 526/318.44

(58) Field of Classification Search .......... 430/900, 430/270.1, 910; 349/127, 123–126, 135–136; 252/299.4; 526/270, 273, 318.44; 428/1.2
See application file for complete search history.

(56) References Cited

U.S. PATENT DOCUMENTS

| | | | | |
|---|---|---|---|---|
| 3,897,513 A * | 7/1975 | Sundet | | 525/328.2 |
| 4,876,173 A * | 10/1989 | Maemoto et al. | | 430/271.1 |
| 5,219,945 A * | 6/1993 | Dicker et al. | | 525/276 |
| 5,631,051 A * | 5/1997 | Ito | | 428/1.2 |
| 5,670,084 A * | 9/1997 | Harada et al. | | 252/299.01 |
| 6,136,501 A | 10/2000 | Trefonas, III et al. | | 430/270.1 |
| 6,348,518 B1 * | 2/2002 | Montgomery | | 523/109 |
| 6,451,950 B1 * | 9/2002 | Ma | | 526/319 |
| 6,770,397 B1 * | 8/2004 | Maeda et al. | | 429/217 |
| 6,885,423 B2 * | 4/2005 | Shuto et al. | | 349/127 |
| 7,425,394 B2 * | 9/2008 | Sawatari et al. | | 430/20 |
| 2007/0042604 A1 * | 2/2007 | Ahn et al. | | 438/689 |
| 2008/0199637 A1 * | 8/2008 | Ushiyama et al. | | 428/1.31 |

FOREIGN PATENT DOCUMENTS

JP  11-327142  11/1999
JP  2003-233076  8/2003

* cited by examiner

*Primary Examiner*—Sophie Hon
(74) *Attorney, Agent, or Firm*—Cantor Colburn LLP

(57) ABSTRACT

An organic composition having liquid-crystal alignment characteristics includes a photosensitive compound and a binder resin represented by Formula 1 below:

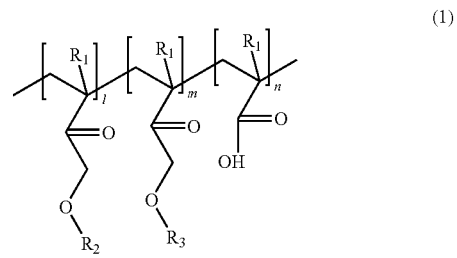

(1)

wherein each R1 is independently hydrogen or a methyl group; R2 is an alkyl group of 4-16 carbon atoms; R3 is an alkyl group of 1-7 carbon atoms, a cyclooxyalkyl group of 1-7 carbon atoms, a benzyl group, or a phenyl group; l, m, and n represent molar ratios of polymerization units and are respectively from about 0.01 to about 0.50, from about 0.10 to about 0.60, and from about 0.03 to about 0.50.

24 Claims, 8 Drawing Sheets

ORGANIC COMPOSITION, LIQUID CRYSTAL DISPLAY INCLUDING THE SAME AND METHOD OF MANUFACTURING LIQUID CRYSTAL DISPLAY

This application claims priority to Korean Patent Application No. 10-2005-0076350 filed on Aug. 19, 2005 and all the benefits accruing therefrom under 35 U.S.C. §119, and the contents of which in its entirety herein incorporated by reference.

BACKGROUND OF THE INVENTION

1. Field of the Invention

The present invention relates to an organic composition, and more particularly, to an organic composition having alignment characteristics, a liquid crystal display including the organic composition and a method of manufacturing the liquid crystal display.

2. Description of the Related Art

A liquid crystal display ("LCD"), which is one of the most widely used flat panel displays, includes two substrates having a plurality of electrodes and a liquid crystal ("LC") layer interposed therebetween. A voltage is applied to the electrodes to allow liquid crystal molecules of the liquid crystal layer to be rearranged to adjust the amount of light transmitted therethrough, thereby displaying images. In the LCD, thin film transistors ("TFTs") are used as switching elements for controlling picture signals applied to the respective electrodes, thereby displaying images.

Among the LCDs, a vertical alignment ("VA") mode LCD, which aligns LC molecules such that the long axes of the LC molecules are perpendicular to the substrates in absence of electric field, is spotlighted because of its wide reference viewing angle. A vertical alignment layer is coated on pixel electrodes and a common electrode by an alignment film printing process using a polyimide based material. The vertical alignment layer is then subjected to a cleaning process. During the alignment film printing process, a portion may be created where the polyimide based material is not coated, which may cause degradation in the alignment characteristic and contamination of the liquid crystal layer. In addition, since the alignment film printing process is a complicated process, processing efficiency may be poor.

Meanwhile, in vertical-alignment mode LCDs, methods for realizing a wide viewing angle include forming cutouts in the electric-field forming electrodes, forming organic films having a pretilt angle on the electric-field forming electrodes and printing vertical-alignment films. Further, for processing simplicity, a method of forming a column spacer for maintaining a cell gap between the organic layer and each of the upper and lower substrates, followed by printing the alignment layer, is being researched and developed.

However, it is difficult to print an alignment film due to poor surface flatness of organic films, thereby increasing the probability of quality degradation using the above method.

BRIEF SUMMARY OF THE INVENTION

The present invention provides an organic composition, which has liquid-crystal alignment characteristics, and at the same time, can be used for an organic film.

The present invention also provides a liquid crystal display including an organic film made of the organic composition.

The present invention also provides a method of manufacturing the liquid crystal display.

Other aspects, features and advantages of the present invention will become clear to those skilled in the art upon review of the following description.

According to an aspect of the present invention, an organic composition having liquid-crystal alignment characteristics includes a photosensitive compound and a binder resin represented by Formula 1 below:

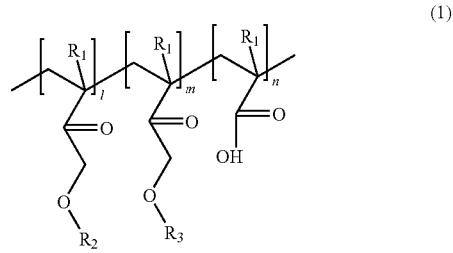

(1)

wherein each $R_1$ is independently hydrogen or a methyl group; $R_2$ is an alkyl group of 4-16 carbon atoms; $R_3$ is an alkyl group of 1-7 carbon atoms, a cyclooxyalkyl group of 1-7 carbon atoms, a benzyl group, or a phenyl group; l, m, and n represent molar ratios of polymerization units and are respectively from about 0.01 to about 0.50, from about 0.10 to about 0.60, and from about 0.03 to about 0.50.

According to another aspect of the present invention, a liquid crystal display includes an electric-field forming electrode formed on a substrate, and an organic film, formed on the electric-field forming electrode. The organic film comprises an organic composition, which has liquid-crystal alignment characteristics and comprises a photosensitive compound and a binder resin represented by Formula 1 below:

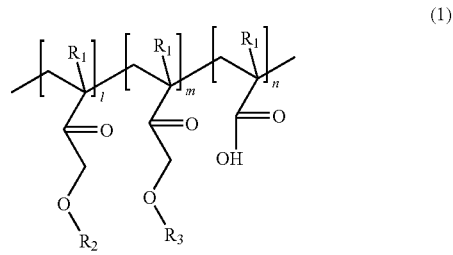

(1)

wherein each $R_1$ is independently hydrogen or a methyl group; $R_2$ is an alkyl group of 4-16 carbon atoms; $R_3$ is an alkyl group of 1-7 carbon atoms, a cyclooxyalkyl group of 1-7 carbon atoms, a benzyl group, or a phenyl group; l, m, and n represent molar ratios of polymerization units and are respectively from about 0.01 to about 0.50, from about 0.10 to about 0.60, and from about 0.03 to about 0.50.

According to still another aspect of the present invention, a method of manufacturing a liquid crystal display is provided. The method includes forming an electric-field forming electrode on a substrate, and coating the electric-field forming electrode with an organic composition having liquid-crystal alignment characteristics and comprising a photosensitive compound, an organic solvent and a binder resin represented by Formula 1 below:

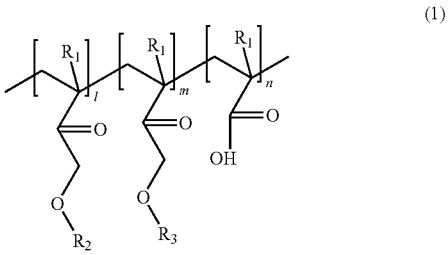

(1)

wherein each $R_1$ is independently hydrogen or a methyl group; $R_2$ is an alkyl group of 4-16 carbon atoms; $R_3$ is an alkyl group of 1-7 carbon atoms, a cyclooxyalkyl group of 1-7 carbon atoms, a benzyl group, or a phenyl group; l, m, and n represent molar ratios of polymerization units and are respectively from about 0.01 to about 0.50, from about 0.10 to about 0.60, and from about 0.03 to about 0.50.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
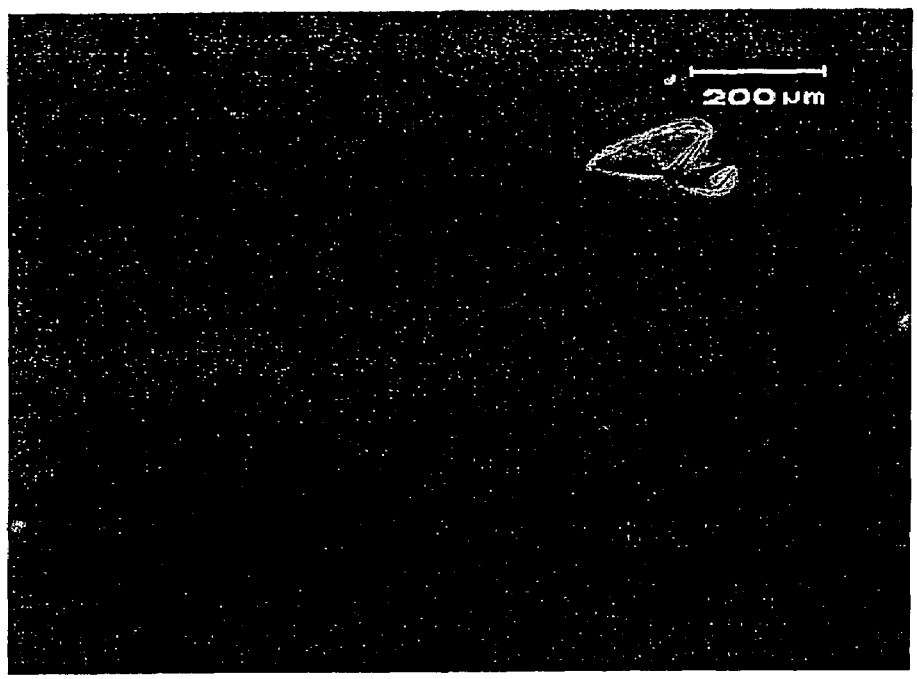
FIGS. 1A and 1B are images showing the alignment characteristics of organic compositions according to Experimental Examples 1 and 2, respectively.

The present invention will now be described more fully with reference to the accompanying drawings, in which preferred embodiments of this invention are shown. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art. The present invention will only be defined by the appended claims. Like reference numerals refer to like elements throughout the specification.

It will be understood that when an element or layer is referred to as being "on", "connected to" or "coupled to" another element, it can be directly on, connected or coupled to the other element or layer or intervening elements may be present. In contrast, when an element is referred to as being "directly on," "directly connected to" or "directly coupled to" another element, there are no intervening elements present. As used herein, the term "and/or" includes any and all combinations of one or more of the associated listed items.

It will be understood that, although the terms a first, a second, etc. may be used herein to describe various elements, various components, various regions, various layers or sections, these should not be limited by these terms. These terms are only used to distinguish one element from another element. Thus, a first element, a first component, a first region, a first layer, or a first section discussed below could be termed a second element, a second component, a second region, a second layer, or a second section, as well, without departing from the teachings of the present invention.

Spatially relative terms, such as "beneath," "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

It is noted that the use of any and all examples, or exemplary terms provided herein is intended merely to better illustrate the invention and is not a limitation on the scope of the invention unless otherwise specified. The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms unless otherwise noted.

Hereinafter, an exemplary embodiment of an organic composition according to the present invention will be described.

The organic composition according to the present invention includes a binder resin represented by Formula 1 below and a photosensitive compound:

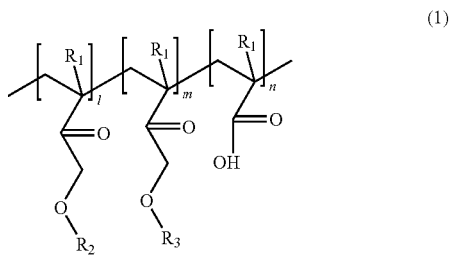

(1)

wherein each $R_1$ is independently hydrogen or a methyl group; $R_2$ is an alkyl group of 4-16 carbon atoms; $R_3$ is an alkyl group of 1-7 carbon atoms, a cyclooxyalkyl group of 1-7 carbon atoms, a benzyl group, or a phenyl group; l, m, and n represent molar ratios of polymerization units and are respectively from about 0.01 to about 0.50, from about 0.10 to about 0.60, and from about 0.03 to about 0.50.

In formula 1, $R_2$ is a functional group exhibiting an alignment characteristic, and examples thereof include butyl, pentyl, hexyl, heptyl, decyl, dodecyl, tridecyl, tetradecyl and the like. In order to attain a better alignment characteristic, $R_2$ may be a single-chain alkyl group, and examples thereof include n-butyl, n-pentyl, n-hexyl, n-heptyl, n-decyl, n-dodecyl, n-tridecyl, n-tetradecyl and so on.

In Formula 1, examples of $R_3$ include methoxy, ethoxy, propyl, isopropyl, gylcidyl, phenyl, benzyl, hydroxy ethyl and so on.

Meanwhile, the compound represented by Formula 1 is not limited to the arrangement sequence of the polymerization units. That is, the compound represented by Formula 1 is defined by the types and molar ratios of the polymerization units regardless of the arrangement sequence of the polymerization units. With proviso that the molar ratios of the polymerization units in a polymer satisfy the above ranges, $R_1$ through $R_3$ can be changed, and different polymerization units can also be used in a mixture form.

The binder resin represented by Formula 1 may have a weight-average molecular weight of about 2,000 to about 300,000, a dispersity of about 1.0 to about 10.0 and an acid value of about 10 KOH mg/g to about 400 KOH mg/g. To offer better alignment characteristics, it is preferable that the binder resin has a weight-average molecular weight of about 4,000 to about 100,000, a dispersity of about 1.5 to about 3.0 and an acid value of about 20 KOH mg/g to about 200 KOH mg/g.

The photosensitive compound ("PAC") serves to change a solubility property through its chemical reaction with light having a predetermined wavelength range. Examples of the photosensitive compound include 2,2',3,4,4'-pentahydroxy benzophenone, 2,2',3,4,4',5-hexahydroxy benzophenone, 2,2',3,4,4'-pentahydroxy diphenylpropane, 2,2',3,4,4',5-pentahydroxy benzophenone, 2,2',3,4,4',5-pentahydroxy diphenylpropane, 2,3,4-trihydroxy benzophenone, 2,3,4-trihydroxy acetophenone, 2,3,4-trihydroxy phenylhexylketone, 2,4,4'-trihydroxy benzophenone, 2,4,6-trihydroxy benzophenone, 2,3,4-trihydroxy-2'-methylbenzophenone, 2,2',4,4'-tetrahydroxy benzophenone, 2,3,4,4'-tetrahydroxy benzophenone, bisphenol-A, 4,4'-[1-[4-[1-(4-hydroxyphenyl)-1-methylethyl]phenyl]-ethylidene]bisphenol, 4,4',4''-trihydroxy phenylmethane, 4,4',4''-ethylidentris(2-methylphenol), bis(4-hydroxyphenyl)methylphenylmethane ballast naphthoquinone-1,2-diazid-4-sulfonate ester or naphthoquinone-1,2-diazid-5-sulfonate ester. The content of the photosensitive compound may be 4 wt % or more based on the weight of the binder resin to increase transparency and to offer optimal developing characteristics. Preferably, the content of the photosensitive compound ranges from about 15 to about 50 wt % based on the weight of the binder resin.

When needed, the organic composition of the present invention may further include an additive such as a colorant, a dye, an antistriating agent, a plasticizer, an adhesion accelerator, a speed enhancer, or a surfactant. The additive may be added singly or in combination of at least two of these compounds. The content of the additive may be in a range of about 0.001 to about 10 wt % based on the weight of the binder resin, but not limited thereto.

The organic composition of the present invention may also have transparency suitable for use as an organic film while maintaining the above composition ratios.

For example, the organic composition of the present invention may be used for an organic film on a substrate. In this case, the organic composition can be used in a dissolved form in an organic solvent. That is, an organic composition solution obtained by mixing the organic composition in an organic solvent is coated on a substrate, followed by exposure, developing, patterning, and complete or partial removal of the organic solvent, to form an organic film including the organic composition. At this time, the organic solvent may have a viscosity from about 1 to about 50 cps to facilitate the formation of the organic film and to provide an excellent coating property.

The organic solvent may be selected in consideration of compatibility with the binder resin, the photosensitive compound and other additive. Examples of the organic solvent may include, but is not limited to, butylacetate, diacetylene glycoldimethylether, diethylene glycoldimethylethylether, methylmethoxypropionate, ethylethoxypropionate, ethyllactate, propylene glycolmethyletheracetate, propylene glycolmethylether, proplylene glycolpropylether, methylcelosolbacetate, ethylcelosolbacetate, diethylene glycolethylacetate, acetone, methylisobutylketone, cyclohexanone, dimethylformamide, N,N-dimethylacetamide, N-methyl-2-pyrrolidone, γ-butylolactone, diethylether, ethyleneglycolmethylether, diglyme, methylcelosolb, ethylcelosolb, diethylene glycolmethylether, diethylene glycolethylether, and dipropylene glycolmethylether. These solvents may be used singly or as a mixture of two or more kinds thereof. Considering solubility, a coating property and transparency of the organic composition, the weight ratio of the organic composition without the organic solvent to the organic solvent may be a range from about 10:1 to about 1:20.

The above-described organic composition according to the present invention will be described in detail through the following concrete experimental examples. However, the experimental example is for illustrative purposes and other examples and applications can be readily envisioned by those of ordinary skill in the art. Since those skilled in the pertinent art can sufficiently analogize the technical contents, which are not described in the following concrete experimental examples, the description thereof is omitted.

Experimental Example 1

A compound represented by Formula 1 where $R_1$ is methyl, $R_2$ is decyl, $R_3$ is benzyl, l, m, and n are respectively 20, 50, and 30, as a binder resin, having a weight-average molecular weight of 10,000, a dispersity of 2.1, and an acid value of 110 KOH mg/g, 2,3,4-trihydroxybenzophenone naphthoquinone-1,2-diazide-5-sulfonic acid ester as a photosensitive compound, a polyoxyalkylene dimethylpolysiloxane copolymer as a surfactant, and propyleneglycolmethylether acetate as an organic solvent were prepared. 20 wt % of the binder resin, 6 wt % of the photosensitive compound, 0.1 wt % of the surfactant, and 73.9 wt % of the organic solvent (based on the total weight of a composition solution) were mixed in a reaction bath equipped with a UV blocking film and a stirrer and stirred at room temperature to prepare an organic composition solution with a viscosity of about 20 cps.

Experimental Example 2

An organic composition solution was prepared in the same manner as in Experimental Example 1 except that a compound represented by Formula 1 where $R_1$ is methyl, $R_2$ is hexyl, $R_3$ is glycidyl, l, m, and n are respectively 40, 30, and 30, having a weight-average molecular weight of 10,000, a dispersity of 2.1, and an acid value of 110 KOH mg/g, was used as a binder resin and 2,3,4,4'-tetrahydroxybenzophenone naphthoquinone-1,2-diazide-5-sulfonic acid ester was used as a photosensitive compound.

Comparative Experimental Example 1

An organic composition solution was prepared in the same manner as in Experimental Example 1 except that a compound represented by Formula 1 where $R_1$ is methyl, $R_2$ is methyl, $R_3$ is benzyl, l, m, and n are respectively 20, 50, and 30, having an average molecular weight of 10,000, a dispersity of 2.1, and an acid value of 110 KOH mg/g, was used as a binder resin.

Each organic composition solution prepared in Experimental Examples 1 and 2 and Comparative Experimental Example 1 was spin-coated on insides of a first plate and a second plate to which polarizers are attached, and cured at 250° C. for 30 minutes, to form organic films. Then, the first plate and the second plate are disposed so that the polarization axis of the polarizer of the first plate is perpendicular to polarization axis of the polarizer of the second plate. Vertical-alignment ("VA") liquid crystals (e.g., commercially available from Merck Ltd.) were injected between the first plate and the second plate.

Figure 1B:
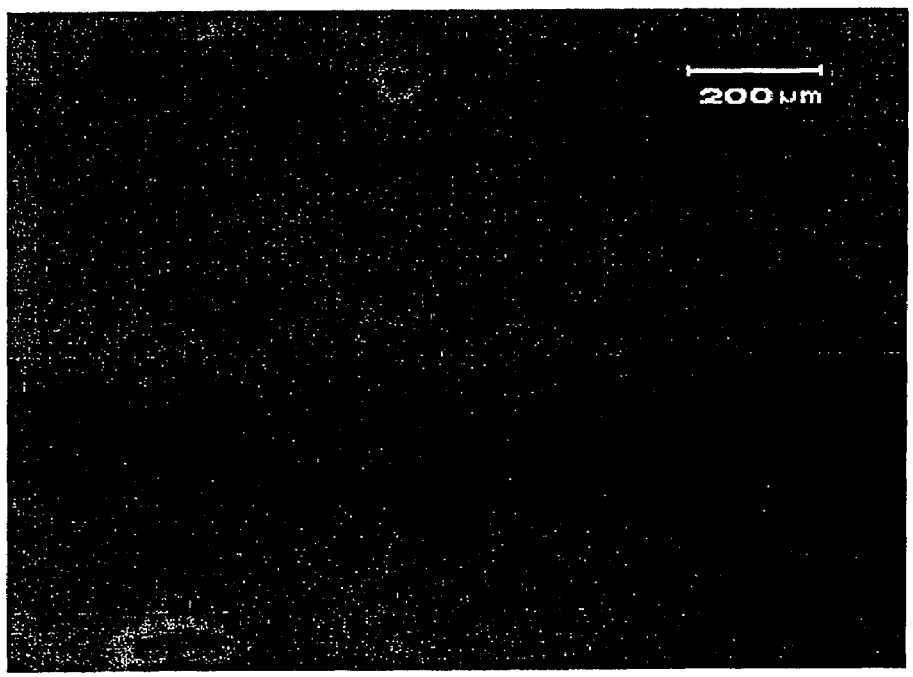
Figure 1C:
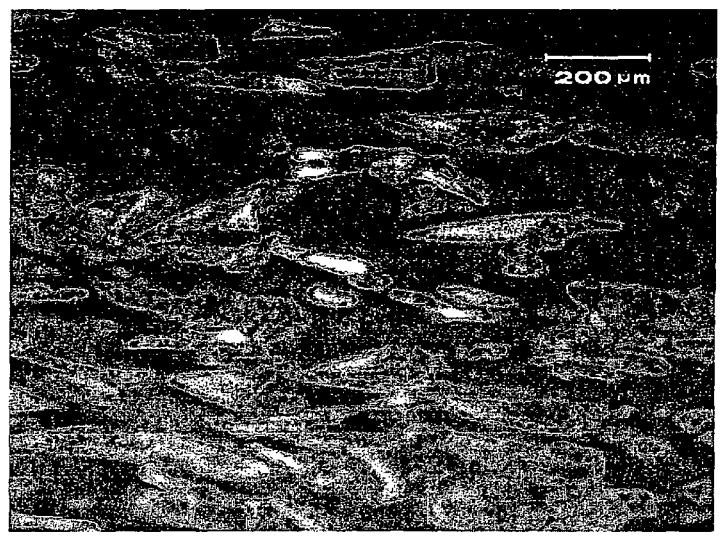
FIG. 1C is an image showing the alignment characteristics of an organic composition according to Comparative Experimental Example 1.

Generally, light irradiated toward a liquid crystal layer is linearly polarized by a polarizer of a first plate. The linearly polarized light is blocked by a polarizer of a second plate having a polarization axis perpendicular to the polarizer of the first plate, since light passing through a liquid crystal layer having VA liquid crystals does not undergo a phase change. Based on these characteristics, the liquid-crystal alignment characteristics of the above-formed organic films were evaluated. For this, the transmittance of light from a backlight irradiated onto the outer surface of a first plate was investigated. The results are shown in FIGS. 1A through 1C. FIGS. 1A, 1B and 1C show light transmittances of the liquid crystal displays including the organic films formed using the organic composition solutions of Experimental Examples 1 and 2 and Comparative Experimental Example 1.

Referring to FIGS. 1A and 1B, black images appeared in the liquid crystal displays including the organic films formed using the organic composition solutions of Experimental Examples 1 and 2 because most of the light emitted from the backlight was blocked. Referring to FIG. 1C on the other hand, a large light leakage area was observed in the liquid crystal display including the organic film formed using the organic composition solution of Comparative Experimental Example 1. This reveals that the organic films formed using the organic composition solutions of Experimental Examples 1 and 2 exhibit better alignment characteristics than the organic film formed using the organic composition solution of Comparative Experimental Example 1. From the above results, it can be seen that an organic composition according to the present invention exhibits excellent vertical alignment characteristics of liquid crystals even in the absence of an alignment film.

The above-described organic composition according to the present invention can be applied for an organic film having alignment characteristics in liquid crystal displays, for example, in various manners. Hereinafter, a liquid crystal display including the organic film made of the above-described organic composition will be described more fully with reference to the accompanying drawings, in which exemplary embodiments of the present invention are shown. An explanation of a part where the organic composition according to an exemplary embodiment of the present invention is applied in the same manner will not be given or simplified in a range where the illustrative embodiment of the present invention can be clearly construed or understood by those skilled in the art.

Figure 2:
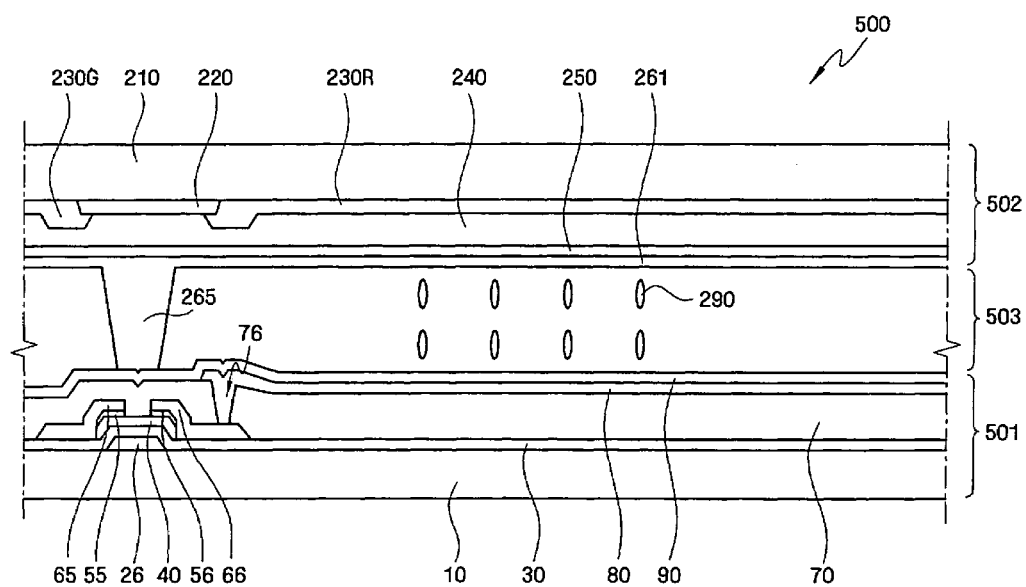
FIG. 2 is a cross-sectional view illustrating an exemplary embodiment of a liquid crystal display according to the present invention.

FIG. 2 is a cross-sectional view illustrating an exemplary embodiment of a liquid crystal display 500 according to the present invention. The liquid crystal display 500 has the structure of a liquid crystal layer 503 interposed between a first plate 501 and a second plate 502.

First, with respect to the first plate 501, gate wires including gate lines (not shown) extending in a first direction and being responsible for gate signal transmission and a gate electrode 26 connected to the gate lines are disposed on a first insulating substrate 10 of the first plate 501.

A gate insulating film 30 made of silicon nitride, for example, is disposed on the gate wires. A semiconductor layer 40 made of a semiconductor material, such as hydrogenated amorphous silicon, is disposed on a portion of the gate insulating film 30 overlapping a gate electrode 26. Ohmic contact layers 55 and 56 are disposed on the semiconductor layer 40 so that a portion of the semiconductor layer 40 is exposed. The ohmic contact layers 55 and 56 are made of amorphous silicon heavily doped with n-type impurity.

Data wires including data lines (not shown) being responsible for data signal transmission extend in a second direction to define pixels at their intersections with the gate lines. A source electrode 65 is connected to the data lines and a drain electrode 66 is separated from the source electrode 65 by a predetermined distance. The data wires, data lines, source electrode 65 and drain electrode 66 are disposed on the gate insulating film 30 on which the semiconductor layer 40 and the ohmic contact layers 55 and 56 are disposed. Portions of the source electrode 65 and the drain electrode 66 overlapping the semiconductor layer 40 are formed in the same pattern as the underlying ohmic contact layers 55 and 56 so that a portion of the semiconductor layer 40 is exposed. The source electrode 65 and the drain electrode 66, together with the underlying gate electrode 26 and semiconductor layer 40, form a thin film transistor.

A passivation film 70 is disposed on the data wires. A pixel electrode 80 corresponding to each pixel is disposed on the passivation film 70. The pixel electrode 80 is made of indium tin oxide (ITO), indium zinc oxide (IZO), or the like. The pixel electrode 80 is electrically connected to the drain electrode 66 via a contact hole 76. The pixel electrode 80, together with a common electrode 250 of the second plate 502, generates an electric field in the liquid crystal layer 503. An organic film 90 is disposed on the pixel electrode 80. The organic film 90 allows liquid crystals to be vertically aligned with respect to the surface thereof. Here, the organic film 90 is made of the organic composition according to the present invention.

The second plate 502 will now be described. A black matrix 220 is disposed on a lower surface of a second insulating substrate 210. The black matrix 220 substantially defines a pixel area and is made of an opaque material such as chromium (Cr). The black matrix 220 serves to improve image quality by preventing light leakage. To reduce an effect of the black matrix 220 on an aperture ratio, the black matrix 220 is formed to overlap the gate wires and/or the data wires of the first plate 501.

A color filter composed of red, green and blue components is disposed below the black matrix 220. FIG. 1 illustrates red and green components 230R and 230G constituting the color filter. However, color components constituting the color filter can be alternately repeatedly formed.

An overcoat film 240 is disposed on a lower surface of the second insulating substrate 210 having thereon the color filter 230R and 230G to planarize the lower surface of the second insulating substrate 210. The common electrode 250 made of ITO or IZO is disposed on a lower surface of the overcoat film 240. The common electrode 250, together with the pixel electrode 80 of the first plate 501, generates an electric field in the liquid crystal layer 503.

An organic film 261 is disposed on a lower surface of the common electrode 250. The organic film 261 allows liquid crystals to be vertically aligned with respect to the surface thereof. The organic film 261 is made of an organic composition according to the present invention.

Liquid crystal molecules 290 are sealed between the first plate 501 and the second plate 502 to form the liquid crystal layer 503. The liquid crystal molecules 290 are vertically aligned with respect to the organic films 90 and 261 of the first plate 501 and the second plate 502.

Meanwhile, a spacer 265 is formed between the organic film 90 of the first plate 501 and the organic film 261 of the second plate 502 to maintain a cell gap for forming the liquid crystal layer 503. The spacer 265 is disposed between the gate wires and/or the data wires of the first plate 501, e.g., a thin film transistor, and the black matrix 220 of the second plate 502 to maintain an aperture ratio. The spacer 265 is made of an organic composition according to the present invention, and may be formed simultaneously with the organic film 90 of the first plate 501 or the organic film 261 of the second plate 502. The spacer 265 may be formed of an organic composition according to an exemplary embodiment of the present invention and may be formed simultaneously with the organic layer 90 of the first plate 501 or the organic layer 261 of the second plate 502.

While the above-described embodiment has been illustrated with the organic film 90 of the first plate 501, the organic film 261 of the second plate 502 and the spacer 265 made of an organic composition according to the present invention, one of the organic film 90 of the first plate 501 and the organic film 261 of the second plate 502 may also be formed as a general alignment film. For example, the organic film 261 made of an organic composition of the present invention is disposed on the lower surface of the common electrode 250 of the second panel 502, whereas an alignment film made of general polyimide, for example, may be substituted for the organic film 90 on the pixel electrode 80 of the first panel 501. At this time, the spacer 265 may be formed simultaneously with the organic film 261.

Figure 3:
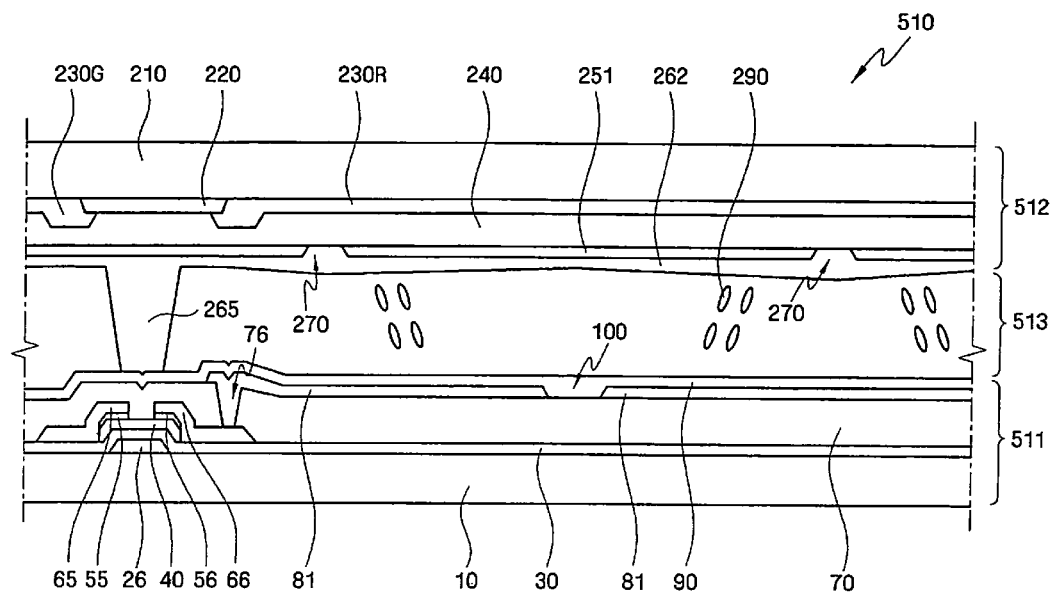
FIG. 3 is a cross-sectional view illustrating another exemplary embodiment of a liquid crystal display according to the present invention.

FIG. 3 is a cross-sectional view illustrating another exemplary embodiment of a liquid crystal display according to the present invention. Since those skilled in the art can sufficiently analogize the same technical contents, which are not described in the following description, the description thereof is omitted.

Referring to FIG. 3, a liquid crystal display 510 includes a first plate 511, a second plate 512 and a liquid crystal layer 513.

Like in the embodiment shown in FIG. 2, the first plate 511 has the structure with gate wires including a gate electrode 26, a gate insulating film 30, a semiconductor layer 40, ohmic contact layers 55 and 56, data wires including source and drain electrodes 65 and 66, and a passivation film 70 disposed on an insulating substrate 10. A pixel electrode 81 made of ITO or IZO and corresponding to each pixel is disposed on the passivation film 70. The pixel electrode 81 is electrically connected to the drain electrode 66 via a contact hole 76. The pixel electrode 81, together with a common electrode 251 of the second plate 512, generates an electric field in the liquid crystal layer 513. Meanwhile, a cutout 100 is disposed as a domain defining member in a pixel area of the pixel electrode 81. The cutout 100 serves to control the alignment direction of liquid crystal molecules 290 by distorting an electric field. An organic film 90 having the alignment characteristics of liquid crystals is disposed on the pixel electrode 81. The organic film 90 is made of an organic composition according to the present invention.

The second plate 512 has the structure with a black matrix 220, a color filter 230R and 230G, and an overcoat layer 240 disposed on an insulating substrate 210, as in the embodiment shown in FIG. 2. The common electrode 251 is formed on a lower surface of the overcoat layer 240 using ITO or IZO. The common electrode 251, together with the pixel electrode 81 of the first plate 511, generates an electric field in the liquid crystal layer 513. A cutout 270 is formed in the common electrode 251. The cutout 270, together with the cutout 100 of the pixel electrode 81, is used as a domain defining member for distorting an electric field. An organic film 262 having a pretilted structure with respect to the cutout 270 and liquid-crystal alignment characteristics is disposed on a lower surface of the common electrode 251. That is, the organic film 262 becomes thicker toward the cutout 270 and becomes thinner away from the cutout 270. The organic film 262 is made of an organic composition according to the present invention.

The liquid crystal molecules 290 are sealed between the organic film 90 of the first plate 511 and the organic film 262 of the second plate 512 to form the liquid crystal layer 513. The liquid crystal molecules 290 are aligned vertically with respect to the organic films 90 and 262 having alignment characteristics. At this time, the liquid crystal molecules 290 are aligned at a pretilt angle in a domain defining direction by tilted alignment induced by the pretilted organic film 262 of the second plate 512 and a change in equi-potential line by a cell gap difference caused by a thickness difference in the organic film 262. When voltages are applied to the common electrode 251 and the pixel electrode 81, the alignment direction of the liquid crystal molecules 290, which are not adjacent to the cutout 270, is determined. Thus, the liquid crystal molecules 290 are driven wholly and rapidly, thereby increasing a response speed.

Meanwhile, a spacer 265 is formed between the organic film 90 of the first plate 511 and the organic film 262 of the second plate 512 to maintain a cell gap for forming the liquid crystal layer 513. The spacer 265 is disposed between the gate wires and/or the data wires of the first plate 511, e.g., a thin film transistor, and the black matrix 220 of the second plate 512 to maintain an aperture ratio. The spacer 265 may be formed simultaneously with the organic film 90 of the first plate 511 or the organic film 262 of the second plate 512 using an organic composition according to the present invention.

Figure 4:
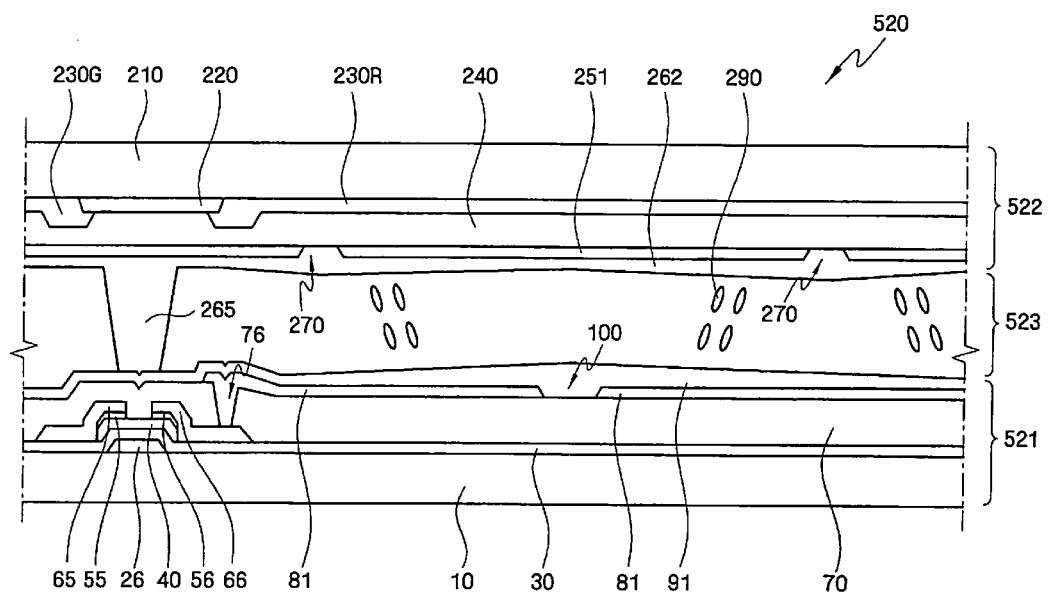
FIG. 4 is a cross-sectional view illustrating yet another exemplary embodiment of a liquid crystal display according to the present invention.

FIG. 4 is a cross-sectional view illustrating still another exemplary embodiment of a liquid crystal display according to the present invention. Since those skilled in the art can sufficiently analogize the technical contents which are not described in the following description and the same parts as those of the LCDs according to exemplary embodiments of the invention, the description thereof is omitted.

Referring to FIG. 4, a liquid crystal display 520 includes a first plate 522, a second plate 522 and a liquid crystal layer 523.

The first plate 522 has the same structure as the first plate 511 shown in FIG. 3 in that gate wires including a gate electrode 26, a gate insulating film 30, a semiconductor layer 40, ohmic contact layers 55 and 56, data wires including source and drain electrodes 65 and 66, a passivation film 70, and a pixel electrode 81 are disposed on an insulating substrate 10. A cutout 100 is formed in the pixel electrode 81 to control the alignment direction of liquid crystals by distorting an electric field.

An organic film 91 having a pretilted structure with respect to the cutout 100 and liquid-crystal alignment characteristics is disposed on the pixel electrode 81. That is, the organic film 91 becomes thicker toward the cutout 100 and becomes thinner away from the cutout 100. The organic film 91 is made of an organic composition according to the present invention.

The second plate 522 has the same structure as the second plate 512 shown in FIG. 3 in that a black matrix 220, a color filter 230R and 230G, an overcoat layer 240, and a common electrode 251 having a cutout 270 are disposed on a lower surface of an insulating substrate 210. An organic film 262 having a pretilted structure and alignment characteristics is formed on a lower surface of the common electrode 251.

Liquid crystal molecules 290 are sealed between the first plate 522 and the second plate 522 to form the liquid crystal layer 523. The liquid crystal molecules 290 are aligned vertically with respect to the organic films 91 and 262 having alignment characteristics. At this time, the liquid crystal molecules 290 are aligned at a pretilt angle in a domain defining direction by tilted alignment induced by the pretilted organic film 91 of the first plate 522 and the pretilted organic film 262 of the second plate 522 and a change in equi-potential line by a cell gap difference caused by a thickness difference in the organic films 91 and 262. When voltages are applied to the common electrode 251 and the pixel electrode 81, the alignment direction of the liquid crystal molecules 290, which are not adjacent to the cutouts 270 and 100, is determined. Unlike in the embodiment shown in FIG. 2, the organic film 91 of the first plate 522 of this embodiment also has a pretilted structure. Thus, the liquid crystal molecules 290 adjacent to the organic film 91 of the first plate 522, as well as the liquid crystal molecules 290 adjacent to the organic film 262 of the second plate 522, are strongly aligned at a pretilt angle. Therefore, the liquid crystal molecules 290 between the first plate 522 and the second plate 522 are wholly and rapidly tilted at a pretilt angle. As a result, the liquid crystal molecules 290 are more rapidly driven, thereby increasing a response speed.

A spacer 265 is formed between the organic film 91 of the first plate 522 and the organic film 262 of the second plate 522 to maintain a cell gap for forming the liquid crystal layer 523. To maintain an aperture ratio, the spacer 265 is disposed at an overlapping region between the gate wires and/or the data wires of the first plate 522, e.g., between a region where a thin film transistor is formed and a region where the black matrix 220 of the second plate 522 is formed. The spacer 265 may be formed simultaneously with the organic film 91 of the first plate 522 or the organic film 262 of the second plate 522 using an organic composition according to the present invention.

Methods of manufacturing liquid crystal displays according to the present invention will now be described more fully with reference to the accompanying drawings, in which exemplary embodiments of the invention are shown.

FIGS. 5 through 15 are sequential cross-sectional views illustrating an exemplary embodiment of a method of manufacturing a liquid crystal display according to the present invention.

Figure 5:
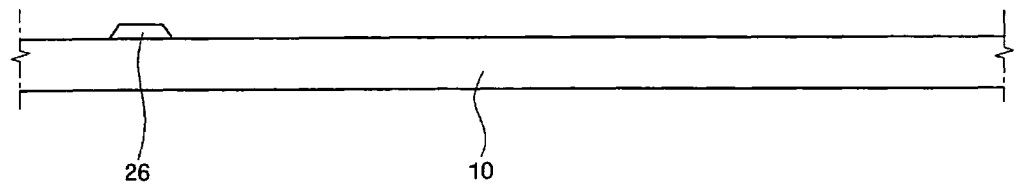
FIGS. 5 through 15 are sequential cross-sectional views illustrating an exemplary embodiment of a method of manufacturing a liquid crystal display according to the present invention.

Referring to FIG. 5, a conductive material such as aluminum, copper, silver, or an alloy thereof is deposited on a first insulating substrate 10 and patterned to form gate wires including a gate electrode 26. When needed, the gate wires may be formed as a multi-layer structure.

Figure 6:
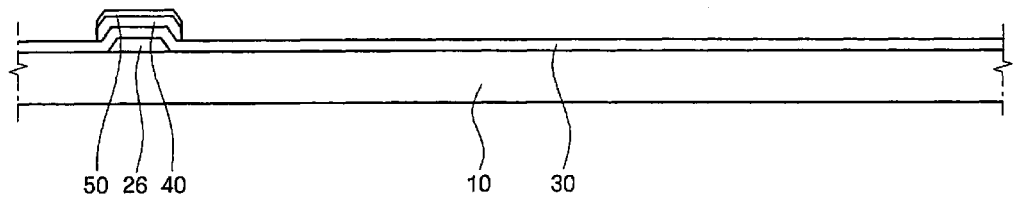

Referring to FIG. 6, silicon nitride, for example, is deposited on the entire surface of the first insulating substrate 10 having thereon the gate wires to form a gate insulating film 30. Then, hydrogenated amorphous silicon and n+ hydrogenated amorphous silicon doped with high-concentration n-type impurity are sequentially deposited on the gate insulating film 30 and patterned to form a semiconductor layer 40 defining a channel region of a thin film transistor and a n+ hydrogenated amorphous silicon layer 50 on the semiconductor layer 40.

Figure 7:
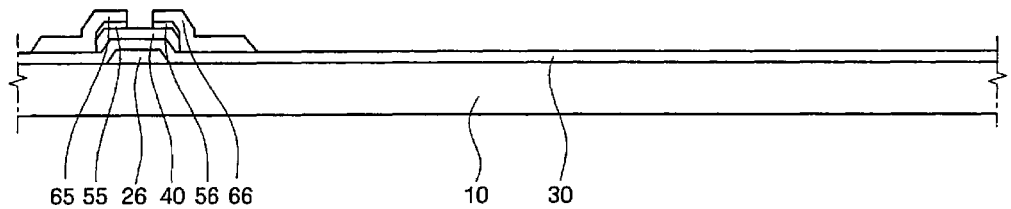

Referring to FIG. 7, a conductive material such as aluminum, copper, silver, or an alloy thereof is deposited on the n+ hydrogenated amorphous silicon layer 50 and patterned to form data wires including data lines, a source electrode 65 connected to the data lines, and a drain electrode 66 separated from the source electrode 65 by a predetermined distance. Then, the n+ hydrogenated amorphous silicon layer 50 between the source electrode 65 and the drain electrode 66 is removed to complete ohmic contact layers 55 and 56.

Figure 8:
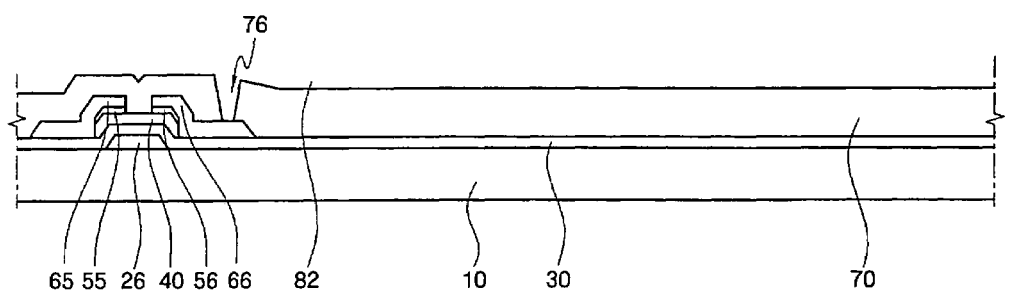

Referring to FIG. 8, an organic material having good flatness characteristics and photosensitivity, a low dielectric insulating material, or an inorganic material such as silicon nitride is deposited on the ohmic contact layers 55 and 56 and patterned to form a passivation film 70 having a plurality of contact holes. FIG. 8 illustrates a contact hole 76 exposing the drain electrode 66.

Figure 9:
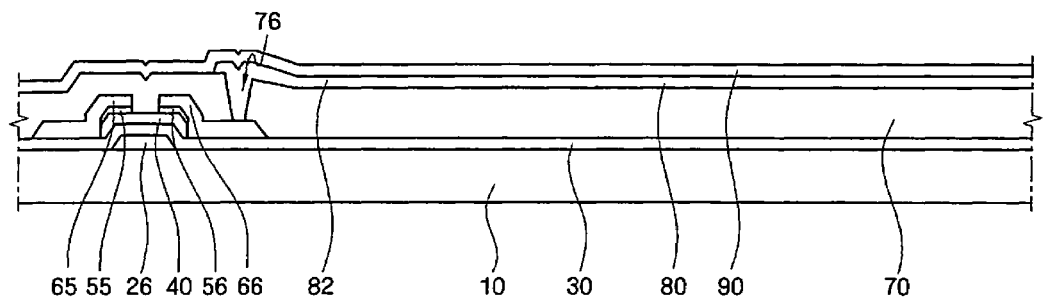

Referring to FIG. 9, ITO or IZO is deposited on the passivation film 70 and patterned to form a pixel electrode 80. Then, an organic composition solution obtained by dissolving an organic composition of the present invention in an organic solvent is coated on the pixel electrode 80 and heated at a high temperature of about 200° C. to about 300° C. for about 10 to about 90 minutes to form an organic film 90. At this time, a common alignment film can be substituted for the organic film 90. This completes the first plate 501 of the liquid crystal display 500 according to the exemplary embodiment shown in FIG. 2.

Next, a method of forming the second plate 502 of the liquid crystal display 500 according to the exemplary embodiment shown in FIG. 2 will now be described.

Figure 10:
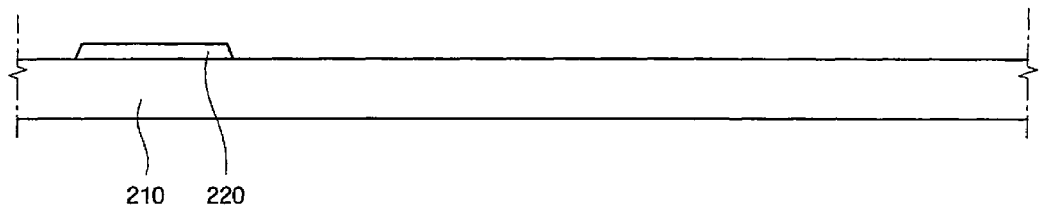

Referring to FIG. 10, an opaque material such as chromium is deposited on a second insulating substrate 210 and patterned to form a black matrix 220.

Figure 11:
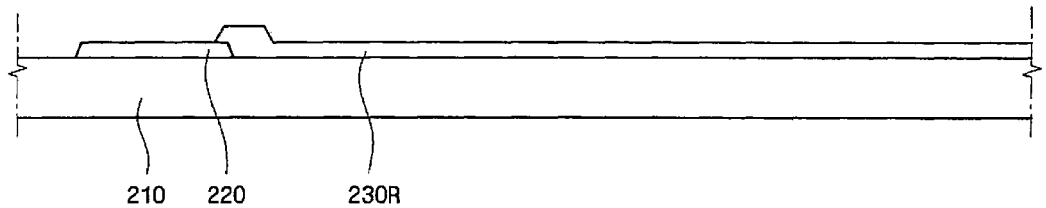

Referring to FIG. 11, red photoresist is coated on the entire surface of the second insulating substrate 210, followed by exposure and developing, to form a red component 230R.

Figure 12:
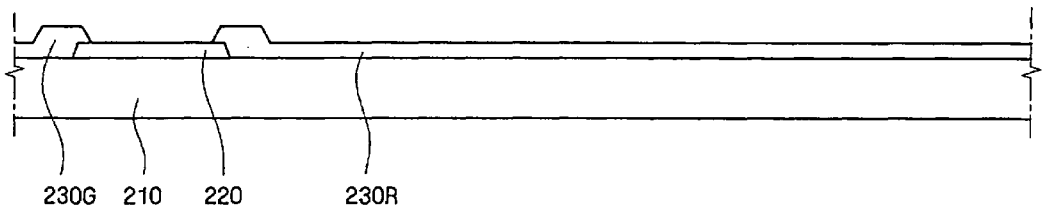

Referring to FIG. 12, green photoresist is coated on the entire surface of the second insulating substrate 210, followed by exposure and developing, to form a green component 230G.

Then, blue photoresist is coated on the entire surface of the second insulating substrate 210, followed by exposure and developing, to form a blue component (not shown). This completes a color filter 230R and 230G composed of the red component 230R, the green component 230G and the blue component. Although this embodiment has been described such that the color filter 230R and 230G is made of photoresist with photosensitivity, the color filter 230R and 230G may also be made of a resin without photosensitivity. In this case, a color resin is first coated on the entire surface of the second insulating substrate 210 and then etched by photolithography. In addition, while this embodiment has been shown and described that the color filter is formed by sequentially stacking the red component 230R, the green component 230G and the blue component in this order, the color filter may also be stacked in any order.

Figure 13:
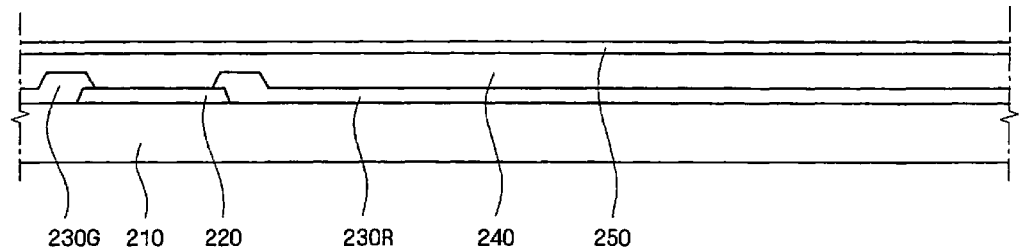

Referring to FIG. 13, an organic material and ITO or IZO are sequentially deposited on the entire surface of the second insulating substrate 210 having thereon the color filter 230R and 230G to form an overcoat layer 240 and a common electrode 250.

Figure 14:
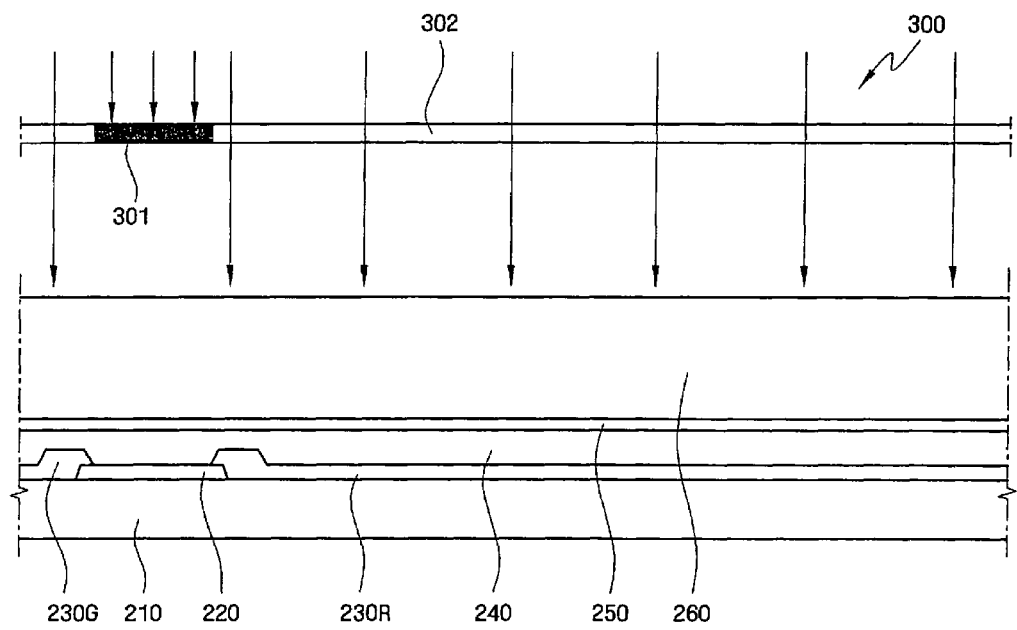

Referring to FIG. 14, an organic composition of the present invention is coated on the common electrode 250 to form an organic coating 260. At this time, the organic composition is coated in a dissolved form in an organic solvent so that the thickness of the organic coating 260 is the same as a cell gap between the first plate and the second plate. Then, the organic coating 260 is treated with soft baking at about 100° C. to about 120° C. Then, a mask 300 having a light-shielding pattern 301 for spacer formation and a transmission region 302 is disposed on the organic coating 260. At this time, it is preferable that the light-shielding pattern 301 of the mask 300 is arranged to correspond to the black matrix 220. Then, the organic coating 260 is exposed to light through the mask 300. At this time, the exposure intensity is adjusted to a low level so that the organic coating 260 corresponding to the transmission region 302 of the mask 300 is partially exposed.

Figure 15:
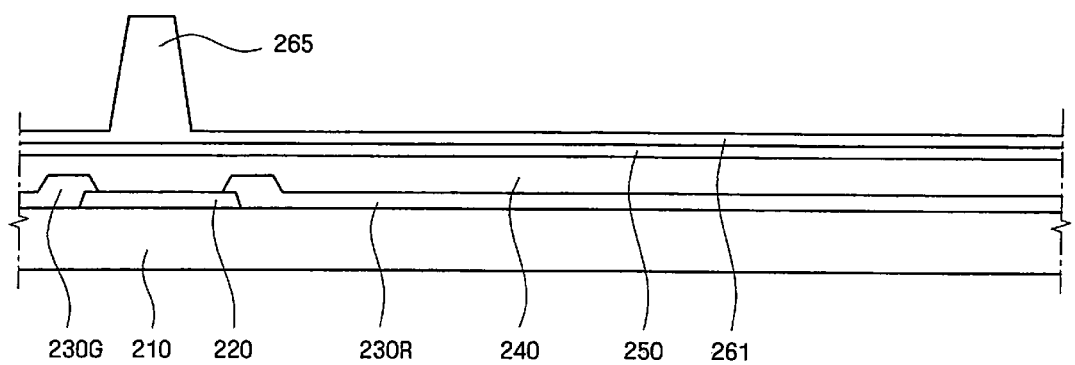

Referring to FIG. 15, the exposed portion of the organic coating 260 is developed with an aqueous alkaline developer. As a result, most of the organic coating 260 corresponding to the light-shielding pattern 301 is left to form a spacer 265. On the other hand, the organic coating 260 corresponding to the transmission region 302 is left to define a small thickness by exposure intensity adjustment to form an organic film 261. For example, the organic film 261 may have a thickness of about 100 nm to about 3,000 nm. Of course, the organic film 261 can be formed to a desired thickness by adjusting the exposure intensity. Instead of adjusting the exposure intensity, the transmission region 302 of the mask 300 may be formed as a slit pattern or a translucent film. The organic film 261 is treated with hard baking at about 130° C. to about 150° C. and cured at about 200° C. to about 300° C. This completes the second plate including the spacer 265. In the above-described method, an alignment film formation process is not separately required, and the organic film 261 having alignment characteristics and the spacer 265 are formed at the same time, thereby simplifying the manufacturing process.

Next, referring again to FIG. 2, the spacer 265 of the second plate 502 is arranged to overlap the gate wires and/or the data wires, e.g., a thin film transistor of the first plate 501, the first plate 501 and the second plate 502 are coupled, and the liquid crystal molecules 290 are injected therebetween to form the liquid crystal layer 503. When the resultant fundamental structure is provided with polarizers, a backlight, compensation plates, etc., the liquid crystal display 500 according to the exemplary embodiment shown in FIG. 2 is completed.

Next, another exemplary method of manufacturing a liquid crystal display according to the present invention will now be described with reference to FIGS. 3 and 16 through 18.

Figure 16:
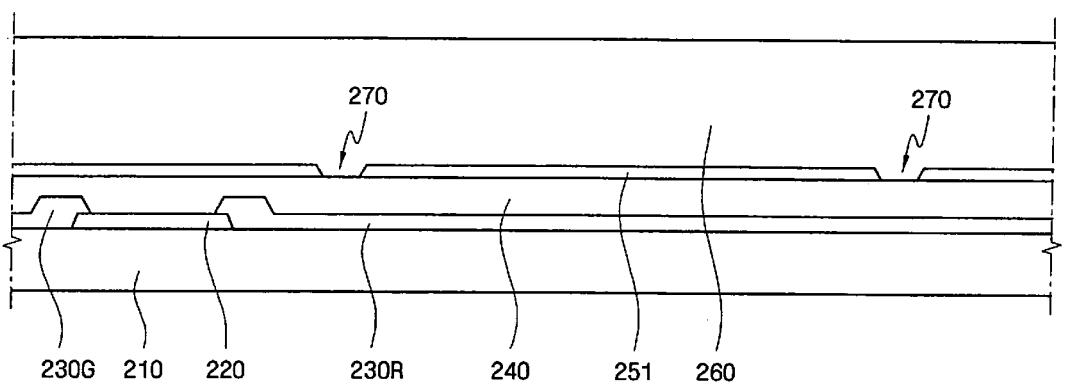
FIGS. 16 through 18 are sequential cross-sectional views illustrating another exemplary embodiment of a method of manufacturing a liquid crystal display according to the present invention.

A method of forming the first plate 511 of FIG. 3 is performed in the same manner as in the above-described exemplary embodiment until a passivation film 70 having a plurality of contact holes is formed. Referring to FIG. 16, ITO or IZO is deposited on the passivation film 70 and patterned to form a pixel electrode 81 having a cutout 100. Then, an organic composition of the present invention is coated on the pixel electrode 81. This completes the first plate 511 according to the exemplary embodiment shown in FIG. 3.

Figure 17:
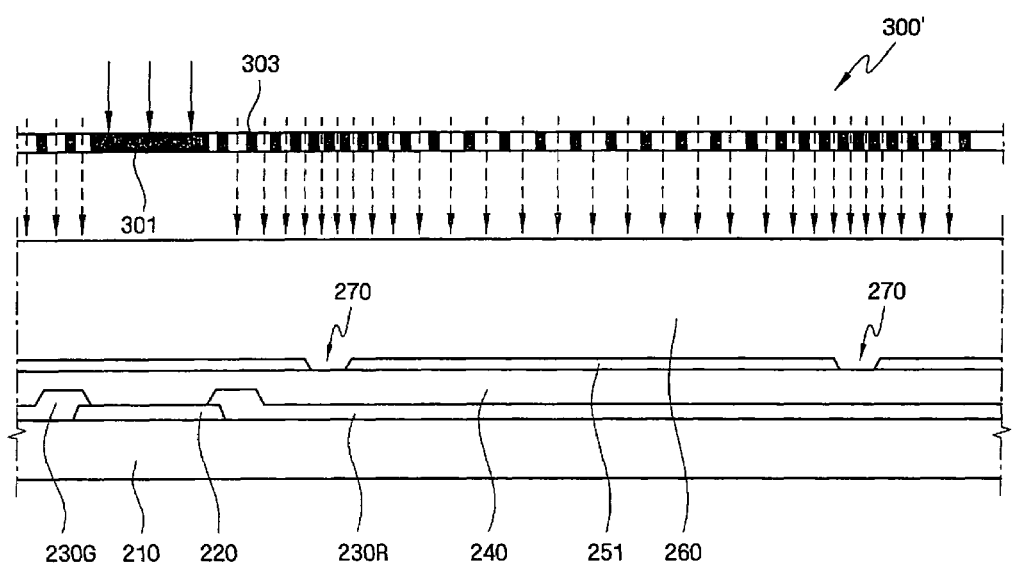

A method of forming the second plate 512 of FIG. 3 is performed in the same manner as in the above-described exemplary embodiment until an overcoat film 240 is formed. Referring to FIG. 17, ITO or IZO is deposited on the overcoat layer 240 and patterned to form a common electrode 251 having a cutout 270. Then, an organic composition of the present invention is coated on the common electrode 251 to form an organic coating 260. At this time, the organic composition is coated in a dissolved form in an organic solvent so that the thickness of the organic coating 260 is the same as a cell gap between the first plate 511 and the second plate 512. Then, a mask 300' having a light-shielding pattern 301 for spacer formation and a slit pattern 303 for pretilted organic film formation is disposed on the organic coating 260. Here, the slit pattern 303 of the mask 300' has a dense portion and a sparse portion. The slit pattern 303 is gradually sparsely patterned from the dense portion to the sparse portion. At this time, the light-shielding pattern 301 of the mask 300' is arranged to correspond to the black matrix 220, and the dense portion of the slit pattern 303 of the mask 300' is arranged to correspond to the cutout 270 of the common electrode 251. Then, the organic coating 260 is exposed to light through the mask 300'.

Figure 18:
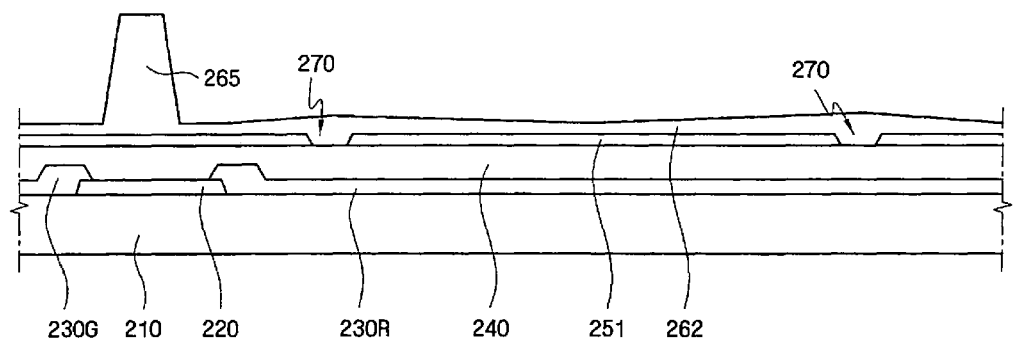

Referring to FIG. 18, the exposed portion of the organic coating 260 is developed with an aqueous alkaline developer. As a result, a portion of the organic coating 260 corresponding to the light-shielding pattern 301 remains to form a spacer 265. On the other hand, a portion of the organic coating 260 corresponding to the slit pattern 303 is left in varying thicknesses according to the slit density of the slit pattern 303. That is, a portion of the organic coating 260, which is adjacent to the cutout 270 of the common electrode 251 corresponding to the dense portion of the slit pattern 303, is left to a relatively thick thickness due to relatively low exposure to light. Whereas a portion of the organic coating 260 corresponding to the sparse portion of the slit pattern 303 is left to a relatively thin thickness. As a result, an organic film 262 is formed which becomes thicker toward the cutout 270 of the common electrode 251 and becomes thinner away from the cutout 270. This completes the second plate 512 including the pretilted organic film 262 and the spacer 265. In the above-described method, it is not necessary to form a separate alignment film due to the alignment characteristics of the organic film 262, and the pretilted organic film 262 and the spacer 265 can be formed at the same time. That is, the pretilted organic film 262 and the spacer 265 can be formed by a one-pot process. Therefore, a process is simplified and the response speed of liquid crystal molecules can be improved.

Next, referring again to FIG. 3, the spacer 265 of the second plate 512 is arranged to overlap the gate wires and/or the data wires, e.g., a thin film transistor of the first plate 511, the first plate 511 and the second plate 512 are coupled, and the liquid crystal molecules 290 are injected therebetween to form the liquid crystal layer 513. When the resultant fundamental structure is provided with polarizers, a backlight, compensation plates, etc., the liquid crystal display 510 according to the exemplary embodiment shown in FIG. 3 is completed.

Meanwhile, the liquid crystal display 520 according to the exemplary embodiment shown in FIG. 4 is substantially the same as the liquid crystal display 510 according to the exemplary embodiment shown in FIG. 3 except that the organic film 91 of the first plate 522 has a pretilted structure. At this time, the above-described method of forming the pretilted organic film 262 of the second plate 512 according to the exemplary embodiment shown in FIG. 3 can be applied to a method of forming the pretilted organic film 91. That is, the pretilted organic film 91 is formed by exposure using a mask with a slit pattern having dense and sparse portions and developing. S since the spacer 265 is formed during forming the second plate 522, there is no need to form a light-shielding pattern in the mask for forming the spacer 265. The coating thickness of an organic composition for forming the organic film 91 may not be the same as a cell gap and may be thinner than the cell gap. Preferably, the organic composition for forming the organic film 91 can be coated to the same thickness as the thickest portion of the pretilted organic film 91.

In the above-described methods of manufacturing liquid crystal displays according to exemplary embodiments of the present invention, a first plate is formed, a second plate is formed and then a liquid crystal layer is interposed between the two substrates. However, the present invention is not limited to the above-described process sequence.

A first plate can also be formed after forming a second plate. Alternatively, a first plate and a second plate can also be formed at the same time. Furthermore, after sequentially forming a first plate (or a second plate), a liquid crystal layer, and a second plate (or a first plate), the first plate, the liquid crystal layer and the second plate can be coupled.

In addition, the above-described embodiments illustrate that a spacer is formed at a second plate. However, a spacer may also be formed at a first plate instead of a second plate. In this case, the spacer is formed simultaneously with an organic film of the first plate. Preferably, the spacer may be formed in a thin film transistor region. It is understood that the spacer and the organic film of the first plate can be formed at the same time using an organic composition of the present invention.

Meanwhile, the above-described exemplary embodiments illustrate a transmission mode liquid crystal display but can also be applied to semi-transmission and reflection mode liquid crystal displays. Furthermore, the above-described exemplary embodiments illustrate that both a color filter and a black matrix are formed at a second plate. However, a color filter and a black matrix may also be formed at a first plate.

Furthermore, first plates illustrated in the above-described embodiments adopt "a bottom gate mode" wherein a gate electrode is disposed below a semiconductor layer, but can also be applied to "a top gate mode" wherein a gate electrode is disposed on a semiconductor layer. In addition, the above-described embodiments illustrate a semiconductor layer and data wires formed by a "five-mask process" using different masks. However, the embodiments are provided only for illustration, and thus a semiconductor layer and data wires may also be formed by a "four-mask process" using one mask.

As described above, an organic composition according to the present invention has both vertical-alignment characteristics and organic film characteristics. Thus, a liquid crystal display including an organic film made of the organic composition does not require an additional alignment film, and thus various problems caused by an alignment film printing process can be eliminated. Furthermore, since an organic film made of the organic composition can be diversely patterned, it is possible to form a pretilted organic film for realizing a wide viewing angle and a spacer for maintaining a cell gap by one-pot process, thereby improving process efficiency.

That is, in concluding the detailed description, those skilled in the art will appreciate that many variations and modifications can be made to the exemplary embodiments described herein without substantially departing from the principles of the present invention. Therefore, the disclosed exemplary embodiments of the present invention are used in a generic and descriptive sense only and not for purposes of limitation.

What is claimed is:

1. An organic composition having liquid-crystal alignment characteristics and comprising a photosensitive compound and a binder resin represented by Formula 1 below:

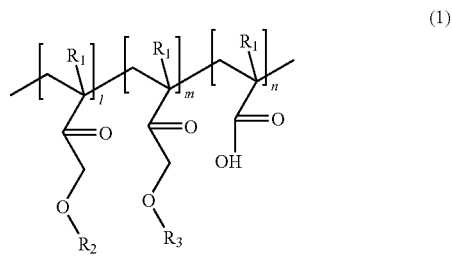

(1)

wherein each $R_1$ is independently hydrogen or a methyl group; $R_2$ is an alkyl group of 4-16 carbon atoms; $R_3$ is an alkyl group of 1-7 carbon atoms, a cyclooxyalkyl group of 1-7 carbon atoms, a benzyl group, or a phenyl group; l, m, and n represent molar ratios of polymerization units and are respectively from about 0.01 to about 0.50, from about 0.10 to about 0.60, and from about 0.03 to about 0.50.

2. The organic composition of claim 1, wherein $R_2$ is a single-chain alkyl group.

3. The organic composition of claim 2, wherein the binder resin has a weight-average molecular weight of about 2,000 to about 300,000, a dispersity of about 1.0 to about 10.0 and an acid value of about 10 KOH mg/g to about 400 KOH mg/g.

4. The organic composition of claim 3, wherein the weight ratio of the photosensitive compound to the binder resin is about 1:25 or more.

5. The organic composition of claim 4, wherein the weight ratio of the photosensitive compound to the binder resin is in a range from about 3:20 to about 1:2.

6. The organic composition of claim 5, further comprising an organic solvent dissolving the binder resin and the photosensitive compound.

7. The organic composition of claim 6, wherein the weight ratio of a mixture of the photosensitive compound and the binder resin, and the organic solvent is in a range from about 10:1 to about 1:20.

8. The organic composition of claim 6, wherein the organic solvent has a viscosity of about 1 cps to about 50 cps.

9. A liquid crystal display comprising:
an electric-field forming electrode formed on a substrate; and
an organic film, formed on the electric-field forming electrode, the organic film comprising
an organic composition having liquid-crystal alignment characteristics and comprises a photosensitive compound and a binder resin represented by Formula 1 below:

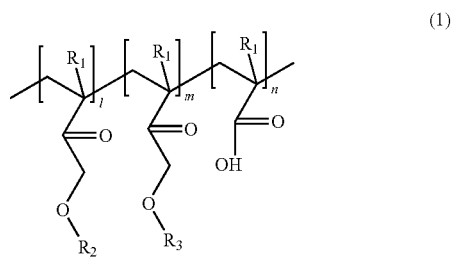

(1)

wherein each $R_1$ is independently hydrogen or a methyl group; $R_2$ is an alkyl group of 4-16 carbon atoms; $R_3$ is an alkyl group of 1-7 carbon atoms, a cyclooxyalkyl group of 1-7 carbon atoms, a benzyl group, or a phenyl group; l, m, and n represent molar ratios of polymerization units and are respectively from about 0.01 to about 0.50, from about 0.10 to about 0.60, and from about 0.03 to about 0.50.

10. The liquid crystal display of claim 9, wherein $R_2$ is a single-chain alkyl group.

11. The liquid crystal display of claim 10, wherein the binder resin has an average molecular weight of about 2,000 to about 300,000, a dispersity of about 1.0 to about 10.0 and an acid value of about 10 KOH mg/g to about 400 KOH mg/g.

12. The liquid crystal display of claim 11, wherein the weight ratio of the photosensitive compound to the binder resin is about 1:25 or more.

13. The liquid crystal display of claim 12, wherein the weight ratio of the photosensitive compound to the binder resin is in a range from about 3:20 to about 1:2.

14. The liquid crystal display of claim 13, further comprising a spacer formed on the electric-field forming electrode and comprising the organic composition.

15. The liquid crystal display of claim 14, wherein the electric-field forming electrode has a cutout as a domain defining member, and the organic film has a tilted structure that becomes thinner away from the cutout.

16. A method of manufacturing a liquid crystal display, the method comprising:
    forming an electric-field forming electrode on a substrate; and
    coating the electric-field forming electrode with an organic composition having liquid-crystal alignment characteristics and comprising a photosensitive compound, an organic solvent, and
    a binder resin represented by Formula 1 below:

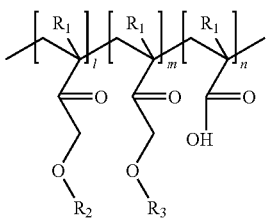

wherein each $R_1$ is independently hydrogen or a methyl group; $R_2$ is an alkyl group of 4-16 carbon atoms; $R_3$ is an alkyl group of 1-7 carbon atoms, a cyclooxyalkyl group of 1-7 carbon atoms, a benzyl group, or a phenyl group; l, m, and n represent molar ratios of polymerization units and are respectively from about 0.01 to about 0.50, from about 0.10 to about 0.60, and from about 0.03 to about 0.50.

17. The method of claim 16, wherein $R_2$ is a single-chain alkyl group.

18. The method of claim 17, wherein the binder resin has an average molecular weight of about 2,000 to about 300,000, a dispersity of about 1.0 to about 10.0 and an acid value of about 10 KOH mg/g to about 400 KOH mg/g.

19. The method of claim 18, wherein the weight ratio of the photosensitive compound to the binder resin is about 1:25 or more.

20. The method of claim 19, wherein the weight ratio of the photosensitive compound to the binder resin is in a range from about 3:20 to about 1:2.

21. The method of claim 20, wherein the weight ratio of a mixture of the photosensitive compound and the binder resin, and the organic solvent is in a range from about 10:1 to about 1:20.

22. The method of claim 21, wherein the organic solvent has a viscosity of about 1 cps to about 50 cps.

23. The method of claim 22, wherein in the coating of the electric-field forming electrode with the organic composition, the organic composition is coated to substantially the same thickness as a cell gap, and wherein after coating the electric-field forming electrode with the organic composition, the method further comprises forming a spacer having substantially the same thickness as the cell gap and an organic film having a thinner thickness than the spacer by exposure using a mask having a light-shielding pattern and developing.

24. The method of claim 23, wherein the forming of the electric-field forming electrode comprises forming a cutout as a domain defining member, and wherein after coating the electric-field forming electrode with the organic composition, the method further comprises forming a tilted organic film which becomes thinner away from the cutout by exposure using a mask having a slit pattern and developing.

* * * * *